Aug. 26, 1924.
N. M. HOPKINS
1,506,302
FLASH LIGHT AND ELECTROLYTIC RECTIFIER
Filed Dec. 20, 1920
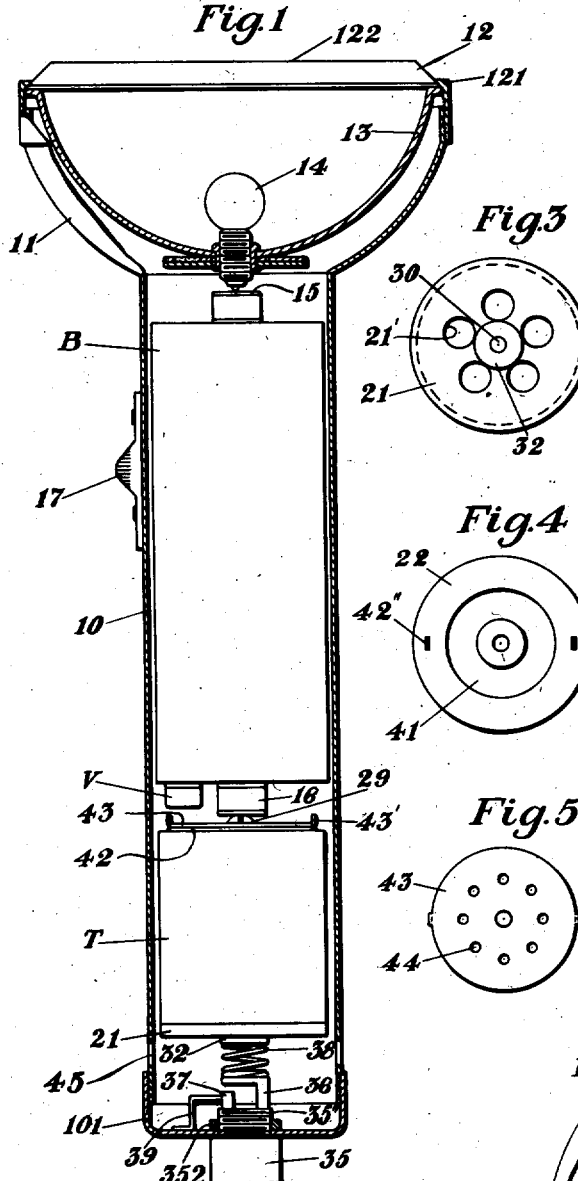
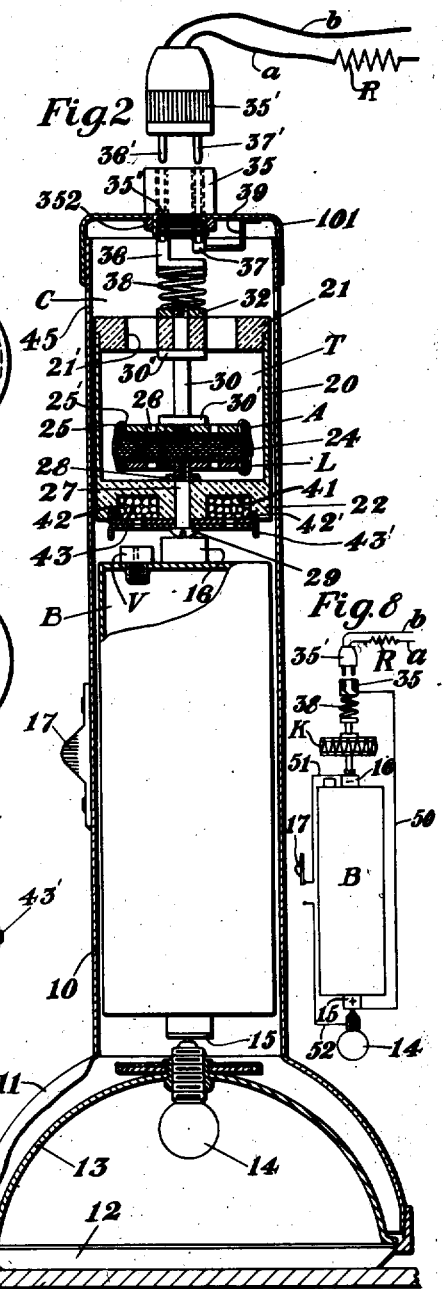
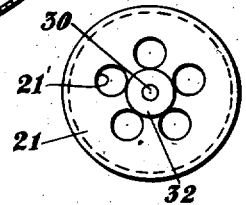
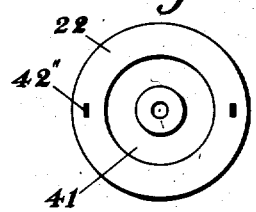
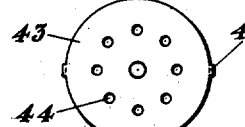
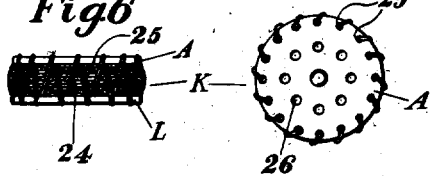
INVENTOR.
Nevil Monroe Hopkins
BY
Byrnes Townsend & Bickenstein
ATTORNEYS.

Patented Aug. 26, 1924.

1,506,302

UNITED STATES PATENT OFFICE.

NEVIL MONROE HOPKINS, OF NEW YORK, N. Y., ASSIGNOR TO NATIONAL CARBON COMPANY, INC., A CORPORATION OF NEW YORK.

FLASH LIGHT AND ELECTROLYTIC RECTIFIER.

Application filed December 20, 1920. Serial No. 432,022.

*To all whom it may concern:*

Be it known that I, NEVIL MONROE HOPKINS, a citizen of the United States, residing at New York, in the county of New York and State of New York, have invented certain new and useful Improvements in Flash Lights and Electrolytic Rectifiers, of which the following is a specification.

This invention relates to portable electric lighting devices and particularly to such devices as flashlights, and hand and pocket lanterns, in which miniature storage batteries employed to supply the low-voltage direct current for lighting the electric lamp are combined with means for recharging such storage batteries. This invention is particularly concerned with portable lighting devices and electrolytic rectifiers for use in recharging the batteries thereof, but it is to be understood that certain features of the invention may be of more general application, and to this extent the embodiment of the invention herein disclosed is merely illustrative of the broader principles involved.

Small storage batteries have heretofore been employed in conjunction with portable lighting devices such as flashlights but such flashlights have not been generally successful or popular principally because the storage batteries have not been conveniently rechargeable by persons unskilled in electrical matters. It has also been found that miniature storage batteries generally employed give off corrosive gases, not only during recharging but also while idle, such gases attacking and corroding metal parts and proving otherwise very objectionable.

The primary objects of the present invention are, therefore, to provide a type of portable electric lighting device, the battery of which may be readily recharged, from the usual electric lighting circuits by persons generally unfamiliar with electrical devices. A further object of this invention is to provide an electric current converting and recharging device, which is of such size that it may readily be carried about with the flashlight or associated therewith so as to form a part of the flashlight.

Another object of this invention is to provide a suitable type of electrolytic current converting device or rectifying means which may be structurally incorporated in the flashlight or portable electric lighting device, or otherwise associated therewith and desirably with a suitable resistance to convert the relatively high-voltage alternating current now generally employed on electric lighting circuits to relatively low-voltage direct current electricity adapted to be supplied to the flashlight storage battery to recharge the same.

Another object of this invention is to provide a flashlight in which the corrosive gases given off by the electrolyte of the storage cell thereof, shall be neutralized to eliminate the objectionable action or effects of such gases.

In copending applications, I have described and claimed types of portable electric current converting devices adapted as recharging means for flashlight storage batteries and the like. In the recharging means embodying the present invention, advantage is taken of the fact that an aluminum electrode, when employed as a cathode element of an asymmetric cell or an electrolytic valve or rectifier having an anode element of a different metal, such as lead or iron, with a suitable electrolyte therebetween, will allow electricity to pass in one direction but not in the other, thus serving to rectify alternating current supplied to such electrodes. While the device herein disclosed embodies an electrolytic rectifier constructed so as to be structurally incorporated with the flashlight to form a unitary structure therewith, it will be understood that an electrolytic rectifier embodying this invention may be constructed as an attachment to be applied to the flashlight whenever it is desired to recharge the battery thereof, or the rectifier may be arranged to be electrically but not mechanically associate with and connected to the flashlight. In the arrangement herein illustrated, the electrolytic rectifying means comprises a "fugitive" cartridge, that is, a cartridge which lasts only a predetermined time and carries sufficient electrolyte material to allow the passage therethrough of a predetermined amount of current, after which the cartridge must be replaced by a new one. The objectionable action of the corrosive gases given off by the electrolyte of the storage cell may be counteracted, as by a suitable acid neutralizing agent or by a suitable neutralizing and reducing agent. As herein disclosed, for the purposes of illustration, the rectifier cartridge and a suitable neutralizing agent are carried by a receptacle that may be enclosed in a compartment of the flashlight casing for example, being readily removable and insertable in proper operative relation to the storage battery in said casing.

The objects and novel features of the present invention will be apparent from the following description taken in connection with the drawings which form a part of this application and in which Fig. 1 is a view of a flashlight embodying my invention, the case thereof being shown in section and parts therein being shown in elevation, Fig. 2 is a view of the flashlight shown in Fig. 1 as disposed in position for recharging the battery thereof, showing portions therein in section, Fig. 3 is a top plan view of the receptacle which carries the rectifier cartridge and the acid neutralizing material, Fig. 4 is a bottom plan view of the same, with the cover of the bottom recess removed, Fig. 5 is a view illustrating the construction of the cover plates covering the bottom recess in the receptacle, Figs. 6 and 7 are, respectively, edge and top views of an electrolytic rectifier cartridge embodying this invention, and Fig. 8 is a diagram of the electrical circuits of a lighting device and charging means embodying this invention.

In the drawings the invention is shown as applied to a portable electric lighting device generally known as a flashlight or pocket lantern, but it will be understood that this is for illustrative purposes only, inasmuch as various features of the invention are of more general application. The flashlight comprises a substantially tubular metal casing 10 that is provided at one end with an enlargement or flaring portion 11 closed at its outer end by a lens 12 suitably clamped to the casing as by a ring 121. A reflector 13 in the enlargement 11 behind the lens 12 has a miniature incandescent electric lamp 14 located substantially at its focus, the lamp having its center contact connected in circuit with the terminal post 15 of the miniature storage battery B. A suitable conductor leading from the other battery terminal post 16 may be connected in electric circuit with the other contact of the lamp by a switch 17 of the usual or any desired construction, to light the lamp. The storage battery B contains suitable negative and positive elements, respectively, connected to the terminal posts 15 and 16, such elements being disposed in a suitable electrolyte, such as sulphuric acid. When the storage battery B is charged or recharged, gases are produced within the battery and means, such as a vent V having a miniature capillary outlet passage, is usually provided to permit such gases to escape, but which passage will ordinarily not permit the escape of the liquid electrolyte even when the storage battery is inverted. For purposes which will hereinafter appear, the storage battery is desirably positioned in the casing 10 with the vent end thereof remote from the lamp 14, but this is not essential in all flashlights employing electrolytic rectifiers for recharging the battery thereof.

In order that the storage battery may be charged or recharged from an ordinary electric lighting circuit, such as an alternating current circuit of 100 to 120 volts as now commonly in use, means must be provided to reduce such potential to a voltage of from say 2 to 8 volts suitable for the particular storage battery to be charged and the current must be rectified so that the current supplied to the storage battery will be a direct current of relatively low-voltage. In the arrangement herein disclosed, suitable resistance means in combination with an electrolytic rectifier are provided to convert the relatively high-potential alternating current electric energy into relatively low-potential direct current. The rectifier may be combined with the flashlight to provide a unitary device or may be a separate device adapted to be associated with the flashlight to charge the battery thereof. The resistance means may or may not be embodied directly in the flashlight or the rectifier and may or may not be external to the flashlight casing.

As shown, the casing 10 rearwardly of the battery B has a compartment C of suitable size to receive an electrolytic rectifier receptacle T that may be inserted into and removed from the casing through the rear end thereof. The receptacle T comprises a substantially cylindrical wall 20 and top and bottom ends 21 and 22 of suitable light watertight, insulating material such as bakelite, impregnated paper board or fiber. The wall 20 and end 22 are desirably moulded as one piece. The receptacle T is adapted to contain the fugitive electrolytic rectifier cartridge K, the end 21 being removable so that the cartridge may be replaced by a new one when its electrolyte is exhausted.

As illustrated, the fugitive cartridge K consists of two opposed plates or electrodes A and L, the electrode A being of aluminum or similar material and the electrode L being of lead, iron, carbon or similar material other than aluminum. The electrodes A and L have a suitable electrolyte compound disposed between them so that when they are included in circuit with a source of alternating current, the aluminum electrode will act to allow electricity to pass in one direction and not in the other, thereby rectifying the alternating current supply and rendering it suitable for charging the storage battery that is also connected in circuit with the cartridge of the rectifier. The electrolyte compound that is disposed between the electrodes A and L may be of any suitable composition and carried in any suitable manner to effect the desired result. As here disclosed, it consists of borax powder which is carried in or confined by suitable absorbent material 24 consisting of layers of fabric of substantially the same diameter as the plates A and L and clamped therebetween by the lacing 25 which may consist of suitable securing means such as nonconducting cord threaded through perforations 25' adjacent the edges of the plates. While suitable liquid or paste electrolyte composition may be carried between the lectrodes A and L, it is generally more desirable to employ a substantially dry electrolyte composition which may be activated for service by the addition of suitable liquid, such as water. In order to activate the rectifier cartridge K, that is, render it capable of acting as a rectifier, it is necessary in the present instance, to saturate the absorbent material with water, thereby dissolving the larger portion of the borax powder. The solution formed provides a suitable electrolyte that will cooperate with the plates A and L to form a complete electrolytic cell. The lacing 25 leaves the edge portion of the cartridge sufficiently exposed so that upon dipping the cartridge in water, the absorbent material 24 may be readily saturated to dissolve the borax powder carried thereby. The plates A and L are also provided with perforations 26 to allow access of the water to the top and bottom sides of the absorbent material. For longer periods of operation the receptacle T may be completely filled with electrolyte when desired.

Suitable terminals are provided whereby the electrodes A and L may be connected in an electrical circuit, such as the circuit including the source of alternating current and the storage battery B. In the present instance, a threaded conducting pin 27 passes through a central hole in the bottom end 22 of the cartridge receptacle and has screw-threaded engagement with a central opening in the plate L, a nut 28 holding the pin in place. The outer end of the pin 27 has a head 29 that is adapted to be electrically connected to or engage the adjacent terminal post 16 of the storage battery. An aluminum connector post 30 having a threaded lower end engages a central threaded opening in the aluminum electrode A and is provided with a flange 30' bearing against the upper face of the plate A. The post 30 also has a flange 30'' bearing against the inner side of the top end 21 of the cartridge receptacle, the said top end being clamped against the flange 30'' and to the post 30 by a nut 32 that engages threads on the outer end of said post. The top end 21 of the cartridge receptacle may be provided with openings 21' to allow the escape of gases formed by the electrolytic action of the rectifier. The cartridge K, when exhausted, may be removed from its receptacle by turning the top end 21 of the receptacle, thereby unscrewing the connection between the pin 27 and the lower plate L. By lifting off the end 21, the post 30, with the cartridge K connected to it, may be withdrawn. The cartridge may then be unscrewed from the post 30 and a new cartridge replaced thereon. If the cartridge is to be rendered active, it must be dipped in water to saturate the absorbent material 24 before the parts are reassembled or a suitable quantity of water or electrolyte may be put into the receptacle T. In order that the receptacle T and the parts carried thereby may be readily removed from the flashlight casing and replaced, the rear end of said casing is provided with a detachable cover or cap 101, which may have a screw-threaded connection to the casing 10.

The electrical supply circuit may be connected to the rectifier and storage battery in any suitable manner. In the arrangement illustrated, a quick-detachable connector is employed comprising an insulating attachment socket member 35 having a reduced threaded end 35'' clamped in an opening in the cover or cap 101 by a nut 352. Conductors 36 and 37, carried by the member 35, are respectively connected to the rectifier electrode A through the nut 32 and to the battery terminal 15 through the casing 10 by suitable conductors, as by a spring 38 and by a conductor 39. The upper end coil of the spring 38 may be secured in a groove in the lower end of the conductor 36 so that the spring may be removed with the cap 101, the other end of the spring being adapted to engage the nut 32 when the cap is in place. The conductor 39 is desirably soldered to the inside of the cap whereby it is adapted to be electrically connected through the casing to the terminal post 15 of the battery, as for example, through suitable contacts of a switch member. The electric supply circuit $a$, $b$ may be electrically connected to the conductors of the flashlight by a suitable plug member 35' which carries pins 36' and 37' electrically connected to conductors $a$, $b$ and insertable into sockets in the outer ends of the conductors 36 and 37. The potential of the usual electric lighting circuit, of say 100 to 120 volts, may be reduced to the proper or desired voltage by a suitable resistance R that may be included in series circuit with the conductors $a$ and $b$.

In order that none of the liquid electrolyte in the battery B shall be discharged through the capillary vent passage in the vent plug V while the battery is gassing incidental to charging the same, it is essential that the vent V be disposed so that it will be substantially uppermost during the charging operation. Suitable means may be provided to support the battery in the correct charging position, and as illustrated, a simple and effective arrangement consists in supporting the flashlight in an inverted position on a flat surface such as a stand or table S, and to this end the lens 12 may be provided with a flat outer face 122 to afford a flat enlarged supporting base for the flashlight and its battery.

While the battery is being charged, and even while it is idle, corrosive gases are formed which escape through the vent and attack metals and are otherwise objectionable. It is, therefore, desirable that these gases be treated so as to prevent the injurious and objectionable action thereof. Accordingly, the gases are treated with a suitable neutralizing agent or a suitable acid neutralizing and reducing agent, in the present instance, just as they escape from the battery. The inside of the lower end 22 of the receptacle T may be provided with an annular recess or cavity 41 adapted to contain a suitable acid neutralizing agent, such as ammonium or sodium carbonate, or a suitable acid neutralizing and reducing agent, such as sodium thio-sulphate. The gas-treating substance is retained in the recess 41 by a suitable cover consisting of two substantially similar shutter plates 42 and 43 which have similarly placed perforations 44 adapted to be moved into and out of register to open the recess 41 to subject the gas to the treatment of said substance, and to close the recess 41 to prevent the loss or deterioration of the substance therein. The two plates 42 and 43 are held in place by the pin 27 which passes through central openings therein. The plate 42 adjacent the bottom face of the end 22 is provided with stamped-up lugs 42' fitting in holes 42" in the bottom end 22 to prevent the rotation of this plate and the outer plate 43 has similar stamped-up lugs 43' projecting outwardly to provide means whereby the plate 43 may be readily engaged and turned relatively to the plate 42 to move the perforations 44 of the two plates into and out of register. The casing 10 may be provided with one or more suitable vent openings 45 near its rear end to permit the escape of the gases formed therein.

The manipulation and operation of the flashlight and its recharging and auxiliary devices will be apparent from the foregoing description. With the parts in assembled operative relation and the flashlight supported in inverted position as shown in Fig. 2 and diagrammatically indicated in Fig. 8, the connector members 35', 35 may be coupled together, whereupon the alternating current from the mains $a$, $b$ will be supplied in the correct direction as low-voltage direct current to the storage battery to charge the same. The path of the current as illustrated by the diagram in Fig. 8, is as follows: Alternating current main $a$, resistance R, connectors 35' and 35, conductor 50, battery terminal 15, battery B, battery terminal 16, rectifier cartridge K, spring conductor 38, connectors 35, 35' to the other alternating current main $b$. The rectifier cartridge K acts as a valve and permits the current to flow in one direction only. The lamp 14 is connected in circuit with the battery B and by closing the switch 17, the conductors 51 and 52 may be electrically connected to light the lamp 14.

While the invention has been illustrated as applied to a familiar type of portable electric lighting device, it will be understood that various features may be applied together or separately to other types of lighting devices and electrolytic rectifiers and to charging apparatus for other types of storage batteries. Numerous changes may be made in the construction and arrangement of the parts of the herein-disclosed device without departing from the spirit of the invention or sacrificing any advantages thereof and the invention is, therefore, not to be limited to the details shown and described.

I claim:

1. A portable electric lighting device comprising in combination, an electric lamp, a storage battery in circuit with said lamp, a casing for said lamp and said battery, asymmetric conducting means removably disposed in said casing in circuit with said battery and means on said casing for coupling current supply means in circuit with said battery and said asymmetric conducting means.

2. In a portable flashlight, the combination with a suitable casing, of a rechargeable battery therein, an electrolytic rectifier removably disposed in said casing in circuit with said battery, and means on said casing for coupling current supply means in circuit with said battery and rectifier.

3. In a portable flashlight, the combination with a tubular casing; of a rechargeable battery therein; an electrolytic rectifier in said casing in circuit with said battery; said casing having a cover at one end permitting access to said rectifier, and having means at its opposite end adapted to support said casing with said battery and rectifier in upright position; and means on said cover whereby current supply means may be coupled in circuit with said rectifier and battery.

4. The combination with a casing; of a storage battery therein; said casing having a compartment therein adjacent said battery; an electrolytic rectifier in circuit with said battery and comprising a receptacle removably disposed in said compartment; and means carried by said casing whereby current supply means may be coupled in circuit with said rectifier and battery.

5. A portable electric lighting device comprising in combination, an electric lamp, a storage battery in circuit with said lamp, a casing for said lamp and said battery, said casing having a compartment adjacent said battery, and charging means for said battery comprising a removable electrolytic rectifying device in said compartment in circuit with said battery.

6. The combination with a casing, of a storage battery therein, a removable electrolytic rectifier in said casing comprising a removable receptacle, terminal means on said receptacle for connecting said rectifier in circuit with said battery, and means whereby current supply means may be coupled in circuit with said terminal means and said battery.

7. The combination with a casing; of a storage battery therein; a removable electrolytic rectifier in said casing comprising a receptacle removable from said casing, electrodes in said receptacle, and electrolyte substance in cartridge form associated with said electrodes; terminal means on said receptacle for connecting said rectifier in circuit with said battery; and means whereby current supply means may be coupled in circuit with said terminal means and said battery.

8. A portable electric lighting device comprising in combination, an electric lamp, a storage battery in circuit therewith, a casing for said lamp and said battery having terminals, and an electrolytic rectifier comprising a receptacle adapted to be associated with said casing and having terminals adapted to be connected in circuit with said battery and said casing terminals, electrodes in said receptacle in circuit with the terminals thereof and electrolyte compound between said electrodes.

9. A portable electric lighting device comprising an electric lamp, a rechargeable battery in circuit with said lamp, a portable casing for said lamp and battery comprising a removable cover carrying electrical terminals adapted for connection to an electric supply circuit, and recharging means for said battery comprising electric current converting means adapted to be connected in circuit with said terminals and said battery.

10. A portable electric lighting device comprising an electric lamp, a storage battery in circuit with said lamp, a portable casing for said lamp and battery comprising a detachable cover carrying electrical terminals adapted for connection to an electric supply circuit, and a removable electrolytic rectifier in said casing adapted to be connected in circuit with said battery and said terminals.

11. An electrolytic rectifier cartridge comprising spaced perforate electrodes, absorbent material between said electrodes, electrolyte compound carried by said material, and means for securing said electrodes together.

12. An electrolytic rectifier comprising a holder having electrical terminals, and a rectifier cartridge removably carried by said holder and having electrodes adapted to be connected in circuit with said terminals.

13. An electrolytic rectifier comprising a receptacle having terminals on opposite portions thereof, one of which is removable, and a rectifier cartridge removably mounted in said receptacle and having electrodes adapted to be connected in circuit with said terminals.

14. A portable electric lighting device comprising in combination, a portable casing, an electric lamp adjacent one end of said casing, a storage battery in said casing in circuit with said lamp and having a gas vent remote from said lamp, rectifying means comprising a receptacle in said casing having terminals in circuit with said storage battery, and means carried by said receptacle for neutralizing gas escaping from said vent.

15. The combination with a receptacle having end portions and compartments, one of said compartments being in the outer side of one of said end portions, terminals carried by said end portions, gas neutralizing compound in the last-mentioned compartment, and an electrolytic rectifier cartridge in the other compartment and removably connected in circuit with said terminals.

16. The combination with a storage battery, of charging means therefor comprising a receptacle having terminals in circuit with said battery, and an electrolytic rectifier in said receptacle having electrodes in circuit with said terminals.

In testimony whereof, I affix my signature.

NEVIL MONROE HOPKINS.